(12) United States Patent
Karaki

(10) Patent No.: US 10,772,121 B2
(45) Date of Patent: Sep. 8, 2020

(54) TECHNIQUE FOR TRANSMITTING UPLINK GRANT INFORMATION

(71) Applicant: Telefonaktiebolaget LM Ericsson (publ), Stockholm (SE)

(72) Inventor: Reem Karaki, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/300,157

(22) PCT Filed: May 8, 2017

(86) PCT No.: PCT/EP2017/060912
§ 371 (c)(1),
(2) Date: Nov. 9, 2018

(87) PCT Pub. No.: WO2017/194465
PCT Pub. Date: Nov. 16, 2017

(65) Prior Publication Data
US 2019/0150186 A1    May 16, 2019

Related U.S. Application Data
(60) Provisional application No. 62/335,237, filed on May 12, 2016.

(51) Int. Cl.
| H04W 72/14 | (2009.01) |
| H04W 74/04 | (2009.01) |
| H04W 72/12 | (2009.01) |
| H04W 74/08 | (2009.01) |

(52) U.S. Cl.
CPC ....... *H04W 72/14* (2013.01); *H04W 72/1284* (2013.01); *H04W 74/04* (2013.01); *H04W 72/1289* (2013.01); *H04W 74/0808* (2013.01)

(58) Field of Classification Search
None
See application file for complete search history.

(56) References Cited

U.S. PATENT DOCUMENTS

| 2016/0007373 | A1  | 1/2016  | Davydov et al. |
| 2017/0257850 | A1* | 9/2017  | Oh ..................... H04W 74/0808 |
| 2018/0352564 | A1* | 12/2018 | Ye ........................ H04L 5/0053 |
| 2019/0014591 | A1* | 1/2019  | Lei ..................... H04W 72/1289 |

(Continued)

OTHER PUBLICATIONS

CMCC, "Discussion on issues related to UL channel access for LAA", 3GPP TSG RAN WG1 Meeting #82, Beijing, China, Aug. 24, 2015, pp. 1-4, R1-154295.

(Continued)

*Primary Examiner* — Eunsook Choi
(74) *Attorney, Agent, or Firm* — Sage Patent Group

(57) ABSTRACT

A technique for transmitting uplink scheduling grant information (702) from a network node to a wireless device in unlicensed spectrum is described. As to a method aspect of the technique, a listen before talk (LBT) process is performed (202) on each of at least one carrier in the unlicensed spectrum. The uplink scheduling grant information is transmitted (304) on one of the at least one carrier in response to a positive result of the LBT process on the one carrier. The uplink scheduling grant information (702) is indicative of an uplink scheduling grant on multiple carriers in the unlicensed spectrum.

17 Claims, 10 Drawing Sheets

(56) References Cited

U.S. PATENT DOCUMENTS

2019/0037565 A1* 1/2019 Zheng .............. H04W 72/0446
2019/0053222 A1* 2/2019 Bhorkar .............. H04W 16/14
2019/0053265 A1* 2/2019 Kim .................. H04W 16/14
2019/0075592 A1* 3/2019 Li ..................... H04W 16/14

OTHER PUBLICATIONS

Broadcom Limited, "Discussion on LAA UL LBT Design", 3GPP TSG-RAN WG1 Meeting #84, Malt, Feb. 15, 2016, pp. 1-14, R1-160817.

Ericsson, "Further consideration on joint grant for up to 32 CCs", 3GPP TSG-RAN WG1 Meeting #82, Beijing, China, Aug. 14, 2015, pp. 1-2, R1-154418.

Fujitsu, "Evaluation of some sensing options for UL LBT", 3GPP TSG RAN WG1 Meeting #82bis, Malmo, Sweden, Oct. 5, 2015, pp. 1-4, R1-155155.

3rd Generation Partnership Project, "3rd Generation Partnership Project; Technical Specification Group Radio Access Network; Evolved Universal Terrestrial Radio Access (E-UTRA); Physical channels and modulation (Release 11)", Technical Specification, 3GPP TS 36.211 V11.4.0, Sep. 1, 2013, pp. 1-120, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.4.0, Sep. 1, 2013, pp. 1-182, 3GPP, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 11)", Technical Specification, 3GPP TS 36.331 V11.5.0, Sep. 1, 2013, pp. 1-347, 3GPP, France.

Qualcomm Europe: "Multicarrier Control for LTE-Advanced", 3GPP TSG RAN WG1 #56bis, R1-091460, Mar. 23-27, 2009, Seoul, Korea, 7 pages, XP050339027.

European Communication Pursuant to Article 94(3), European Application No. 17727494.1, dated Dec. 18, 2019—6 pages.

* cited by examiner

TECHNIQUE FOR TRANSMITTING UPLINK GRANT INFORMATION

TECHNICAL FIELD

The present disclosure generally relates to a technique for transmitting uplink grant information. More specifically, and without limitation, a method and a device are provided for transmitting information indicative of a scheduling grant in a radio access network using unlicensed spectrum.

BACKGROUND

To further increase data rates for mobile telecommunication, cellular networks use unoccupied radio resources in the unlicensed spectrum. Within the 3rd Generation Partnership Project (3GPP), the initiative for License Assisted Access (LAA) defines equipment for Long Term Evolution (LTE) and its next generation successors, which operates in the unlicensed radio spectrum, e.g., in frequency bands near 5 GHz. In LAA, the unlicensed spectrum is used as a complement to the licensed spectrum. Accordingly, stations (including a network node and a wireless device) that are radio-connected on a licensed carrier in the licensed spectrum (which is also referred to as a primary cell or PCell) use carrier aggregation to benefit from the additional transmission capacity of unlicensed carriers in the unlicensed spectrum (which are also referred to as a secondary cells or SCells). To reduce changes required for aggregating licensed and unlicensed spectrum, a radio frame timing defined according to LTE in the primary cell is simultaneously used in the secondary cells. Further initiatives such as MulteFire within the MulteFire Alliance define standalone implementations based on LTE relying exclusively on the unlicensed spectrum.

Regulatory requirements, however, may not permit transmissions in the unlicensed spectrum without prior sensing on the unlicensed carriers. Since the unlicensed spectrum must be shared with other radio transmitters of similar or dissimilar wireless technologies, a so-called listen-before-talk (LBT) process is applied. For example, the unlicensed 5 GHz spectrum can also be used by equipment implementing a Wireless Local Area Network (WLAN) according to the standard family IEEE 802.11, which is also known as Wi-Fi.

Wi-Fi as well as LAA are capable of operating in a multi-carrier mode, i.e., transmitting simultaneously on multiple unlicensed carriers, e.g., in the 5 GHz band. Conventional Wi-Fi follows a hierarchical multi-carrier LBT scheme, which is known as channel bonding.

In conventional LTE, licensed carriers can be aggregated and utilized for data transmission to boost the throughput. Due to the introduction of LAA in 3GPP Release 13, for example according to the document 3GPP TR 36.889 V13.0.0 (2015-06), there is a need to support multi-carrier operation on unlicensed carriers.

However, conventional LBT designs lead to an inefficient multi-carrier operation. As for one example, if a station is transmitting on one or more carriers, same station cannot listen on any further non-transmitting carrier during the transmission, e.g., by design or due to cross-carrier self-interference. The cross-carrier interference may relate to adjacent channels of the same station, which can leak energy to each other. Herein, "adjacent" includes (but is not limited to) channels that are seamlessly next to each other. As for same or another example, a station may transmit on one channel and receive on other channel, if the channels are located sufficiently apart in the spectrum. Therefore, for downlink data transmission, it is important to increase the likelihood that multiple carriers complete the LBT process and simultaneously start transmitting, since the network node may be unable to perform further channel sensing or data reception as long as it is transmitting.

For uplink data transmission, a scheduled radio access technology such as LTE requires the network node to transmit uplink scheduling grant information to the wireless device before the wireless device transmits its data. If the transmission of grant information on multiple carriers in the downlink is treated similarly to the downlink data transmission, the network node performs an LBT process on each carrier in the unlicensed spectrum in order to access the channel and grant the wireless device the uplink data transmission.

If the LBT succeeds on one carrier, the network node transmits the grant on this carrier. Only the carriers that transmit the grant can grant the wireless device an uplink transmission. The problem with this solution is that each carrier may end up with different intended transmit times, e.g., due to a random backoff of the LBT process on each carrier and different interference levels on each carrier. As a result, only one carrier is actually utilized for grant transmission and it is very unlikely to operate on multiple carriers neither for grant transmission nor for the uplink data transmission in unlicensed spectrum. Moreover, as the number of aggregated or available carriers increases, the probability that each of these carriers is utilized further decreases.

Since the time of successful conclusion of LBT processes performed on carriers in the unlicensed spectrum is uncertain and the downlink transmission on the first successfully accessed carrier defers any other LBT process, the number of carriers for which the wireless device receives an uplink scheduling grant from the network node is uncertain.

SUMMARY

Accordingly, there is a need for a technique that allows granting a defined number of carriers in unlicensed spectrum for radio access.

As to one aspect, a method of transmitting uplink scheduling grant information from a network node to a wireless device in unlicensed spectrum is provided. The method comprises or triggers a step of performing a listen before talk (LBT) process on each of at least one carrier in the unlicensed spectrum; and a step of transmitting the uplink scheduling grant information on one of the at least one carrier in response to a positive result of the LBT process on the one carrier, the uplink scheduling grant information being indicative of an uplink scheduling grant on multiple carriers in the unlicensed spectrum.

In at least some embodiments, by transmitting the uplink scheduling grant information for the multiple carriers in one carrier that is accessible in the unlicensed spectrum due to the successfully completed LBT process, the wireless device is granted the defined number of multiple carriers indicated by the uplink scheduling grant information. Same or other embodiments can transmit the uplink scheduling grant information for a multi-carrier operation, e.g., using carrier aggregation for the uplink data transmission.

The technique may be implemented to improve or enable an uplink multi-carrier transmission (e.g., in license assisted access or in standalone unlicensed access) by transmitting a cross-carrier grant information in the unlicensed spectrum to increase the likelihood that the wireless device uses a joint transmission over multiple carriers for uplink data.

The term "carrier" may encompass any radio channel, frequency carrier, component carrier, cell and/or secondary cell. The carriers indicated in the uplink scheduling grant information are referred to as the multiple carriers or the granted carriers.

Transmitting, on one carrier, the uplink scheduling grant information that is indicative of the uplink scheduling grant on multiple carriers may also be referred to as cross-carrier scheduling in unlicensed spectrum. The uplink scheduling grant information indicative of the uplink scheduling grant on multiple carriers may be included in one downlink control information (DCI), in one subframe (SF) and/or in one radio block (RB).

The uplink scheduling grant information may be transmitted on a control channel, e.g., a Physical Downlink Control Channel (PDCCH) or an Enhanced PDCCH (EPD-CCH), using the one carrier. A PDCCH message or an EPDCCH message may include the uplink scheduling grant information (which may be collectively referred to as a scheduling message).

Each scheduling message may be transmitted on separate radio resources of the PDCCH or the EPDCCH. The network node may transmit multiple scheduling messages to different wireless devices simultaneously, e.g., within one subframe, using the one carrier.

The uplink scheduling grant information may further include at least one of a Physical Uplink Shared Channel (PUSCH) resource indication, a transport format and information related to a Hybrid Automatic Repeat Request (HARQ). The DCI may further include power-control commands for the uplink transmission on the PUSCH. Alternatively or in addition, a carrier indication field (CIF) in the DCI may be indicative of the multiple carriers. The CIF may be included or inserted in the beginning of the PDCCH or EPDCCH message.

Without limitation, the network node may be any component granting radio access, transmitting information indicative of the grant and/or controlling the granting. The network node may be an access point or a base station (e.g., an evolved Node B or eNB) of a radio access network (RAN), e.g., a cellular network. The RAN may comprise a plurality of such network nodes, optionally connected by a backhaul network.

The network node may perform the method. Alternatively or in addition, the network node may determine the number of carriers for performing the one or more LBT processes. The network node may decide to perform the LBT process on only one carrier and may send the uplink scheduling grant information for the multiple carriers on the one carrier.

Without limitation, the wireless device may be any component receiving the grant information and/or using the radio resources granted according to the grant information. The wireless device may be any device capable of wireless communication with the network node, e.g., based on the grant information.

The network node and the wireless device may communicate according to a radio access technology (RAT), e.g., Long Term Evolution (LTE) of 3GPP. The technique may be implemented in conformity with Licensed Assisted Access (LAA) of 3GPP, MulteFire of the MulteFire Alliance and/or LTE in unlicensed spectrum (LTE-U) of 3GPP. The technique may be implemented on a physical layer (or Layer 1) and/or a data link layer (or Layer 2) of a radio communication protocol of the RAT.

The wireless device may be any mobile, portable or stationary (or fixed) device. The wireless device may be a user equipment (UE) and/or a device for machine-type communication (MTC), e.g., including or controlling a sensor or an actuator, which provides data or status information that is reported in the uplink data.

The network node and the wireless device may be collectively referred to as stations. The unlicensed spectrum may be shared, or potentially used, by different stations (e.g., stations belonging to different RANs and/or implementing different RATs). The technique may be operated in coexistence with Wi-Fi.

For brevity, the uplink scheduling grant may be referred to as a "grant". The uplink scheduling grant information may be referred to as "grant information". A radio communication direction from the wireless device (or a subcomponent thereof) to the network node (or the RAN) may be referred to as "uplink". The grant may be an uplink grant in that the grant may relate to the uplink. The network node (or the RAN) may specify a frame structure, e.g., a radio frame including subframes.

The grant may be a scheduling grant in that the grant may relate to a certain time in the future or to one or more certain subframes. By way of example, the grant information sent in the t-th subframe may be indicative of the grant for the (t+x)-th subframe, wherein x>0 may be predefined by the RAT and/or undefined in the grant information.

A coexistence mechanism may define the LBT process for the unlicensed spectrum and/or a duration of a transmit opportunity (TXOP) for the unlicensed spectrum after a positive (or successful) LBT process. Each of the network node and the wireless device may apply the coexistence mechanism before transmitting in the unlicensed spectrum.

The wireless device may perform an LBT process on some (e.g., a proper subset) or each of the multiple carriers indicated by the uplink scheduling grant information. On some (e.g., a proper subset) or each of those carriers for which the LBT process yields a positive result, the wireless device may start transmitting data.

The multiple carriers indicated in the uplink scheduling grant information may include one or more carriers other than the one carrier on which the uplink scheduling grant information is transmitted.

It is not essential that the one carrier used for transmitting the uplink scheduling grant information be also granted to the wireless device for uplink transmission according to the uplink scheduling grant information.

The multiple carriers of the uplink scheduling grant may include the one carrier on which the uplink scheduling grant information is transmitted. The one carrier used for transmitting the uplink scheduling grant information may be included in the set of the multiple carriers granted to the wireless device after a positive assessment or without assessing the one carrier.

One or more carriers other than the one carrier on which the uplink scheduling grant information is transmitted may be included in the set of the multiple carriers granted to the wireless device only after a positive assessment of each of the one or more other carriers. The assessment of a carrier may be based on a metric determined for the corresponding carrier.

Each LBT process may include at least one of a Clear Channel Assessment (CCA), a Distributed Coordination Function (DCF) Inter-Frame Space (DIFS) interval and a backoff mechanism. The backoff mechanism may be based on a backoff time (or a backoff timer). The backoff time may be decremented by each positive CCA, e.g., within a contention window. The backoff time and a size of the contention window may be discretized or defined in integer multiples of a backoff slot. The length of each backoff slot may be 9 microseconds (9 μs).

One subframe may include a plurality of symbols, e.g., 12 or 14 orthogonal frequency-division multiplexing (OFDM) symbols (e.g., for normal and extended cyclic prefix length, respectively). By way of example, the normal cyclic prefix length may be about 4.69 μs and a subcarrier spacing may be 15 kHz, so that the symbol length may be $^1\!/_{15}$ kHz+4.69 μs=71.29 μs.

After expiry of the DIFS interval, the CCA (and, if the CCA is positive, the decrementing step for decrementing the backoff time) may be performed once per backoff slot. In a variant, the CCA and the decrementing step are performed, e.g., 8 times per OFDM symbol duration.

The backoff time may be initialized by a random (or pseudo-random) value, e.g., independently for each LBT process on each carrier. Such a backoff mechanism may be referred to as random backoff mechanism. Alternatively or in addition, the initial value of the backoff time may be doubled in response to a collision upon transmitting on the corresponding carrier, which may be referred to as exponential backoff mechanism.

The LBT process may be performed on each of at least two carriers in the unlicensed spectrum. The LBT processes may be performed independently on each of the at least two carriers. The uplink scheduling grant information may be transmitted on the one carrier whose the LBT process is the first to return the positive result. The LBT process yielding the first positive result may be the one used for transmitting the uplink scheduling grant information.

The network node may transmit the uplink scheduling grant information in response to expiry of the backoff time of the backoff mechanism.

The uplink scheduling grant may relate to multiple subsequent subframes. By way of example, the grant information transmitted in the t-th subframe may be indicative of the grant for the subframes t+x to t+x+k, wherein k+1>1 is the number of the multiple subsequent subframes.

The wireless device may transmit data in one or more of the multiple subsequent subframes according to the coexistence mechanism for the unlicensed spectrum. After transmitting data for the TXOP duration, the wireless device may perform a further LBT process. Within the multiple subsequent subframes, the wireless device may repeat performing the LBT processes and, for the TXOP duration, transmitting data.

A number of the multiple subsequent subframes may correspond to the TXOP duration in the unlicensed spectrum, or may be less or more. For example, the number of the multiple subsequent subframes may be the maximum integer number of subframes that fit within the TXOP duration.

The multiple carriers may be a (e.g., proper) subset of carriers available in the unlicensed spectrum. A number of the multiple carriers may correspond to a number of LBT chains or a number of processing chains supported by the wireless device for uplink data. The number of processing chains may be the maximum number of transport blocks that the wireless device is capable of preparing simultaneously.

The method may further comprise or trigger a step of determining a metric for each of a plurality of carriers available in the unlicensed spectrum and, optionally, selecting the multiple carriers based on the metric.

The metric may be based on measurements or determinations of the network node and/or reports (e.g., status reports or measurements) from the wireless device. The metric (or factor on which the metric is calculated) may be measured by the network node and/or reported by the wireless device.

The network node may grant (as the set of the multiple carriers) any subset of the carriers of the unlicensed spectrum. Out of the granted set of the multiple carriers, the wireless device may use any subset for performing its LBT processes. Out of the LBT-successful set, the wireless device may use any subset for uplink data transmission. The selection of one or more of these subsets of carriers may be based on the metrics of the corresponding carriers.

Alternatively or in addition, the metric may depend on a ratio of LBT processes with positive result and LBT processes with negative result on the respective carrier. The numbers of positive and negative LBT process results may relate to LBT processes performed by the network node and/or LBT processes performed by the wireless device (e.g., on the respective carrier in each case).

Alternatively or in addition, the metric may depend on a radio quality of the respective carrier or a channel quality, e.g., the quality of a channel for communicating between the network node and the wireless device using the corresponding carrier. The radio quality may depend on energy detected on the respective carrier. Alternatively or in addition, the channel quality may depend on a signal-to-noise ratio and/or a signal to noise and interference ratio.

Alternatively or in addition, the metric may depend on a backoff time or a contention window size assigned by the network node to the wireless device for the respective carrier.

The network node may determine the number of the multiple carriers (that are indicated in the uplink scheduling grant information) depending on metrics of a plurality of wireless devices. The metrics may include or depend on at least one of the Quality of Service (QoS) associated with uplink data at the corresponding wireless devices, the status of an uplink data buffer of the corresponding wireless devices, the number of LBT chains and the number of processing chains supported by the corresponding wireless devices.

For example, the network node may balance uplink scheduling grants among different wireless devices including the wireless device. The number of the multiple carriers granted to the wireless device may be less than the number of LBT chains or the number of processing chains supported by the wireless device.

Alternatively, the number of the multiple carriers may be greater than the number of processing chains supported by the wireless device, e.g. to increase a number of successful LBT processes at wireless device. The wireless device may select N carriers out of the multiple carrier in the grant information to perform LBT processes on each of the N carriers. The number of N selected carriers may correspond to the number of processing chains. The selection performed by the wireless device may be based on measurements performed by the wireless device and/or a metric similar or equal to the metric described above in the context of determining the multiple carriers.

The network node may transmit a further uplink scheduling grant information to a further wireless device. The set of the multiple carriers indicated in each of the uplink scheduling grant information transmitted to different wireless devices may be disjoint.

The method may further comprise or trigger a step of receiving a scheduling request and/or a buffer status report from the wireless device. The method or at least the step of transmitting the uplink scheduling grant information may be performed in response to the reception of the scheduling request and/or the buffer status report.

The method may further comprise or trigger a step of receiving uplink data from the wireless device by means of multi-carrier aggregation of two or more of the multiple carriers.

As to a further aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the RAN and/or the Internet.

As to another aspect, a device for transmitting uplink scheduling grant information from a network node to a wireless device in unlicensed spectrum is provided. The device may be configured to perform the one method aspect. Alternatively or in addition, the device comprises a listen-before-talk unit configured to perform a listen before talk (LBT) process on each of at least one carrier in the unlicensed spectrum; and a transmit unit configured to transmit the uplink scheduling grant information on one of the at least one carrier in response to a positive result of the LBT process on the one carrier, the uplink scheduling grant information being indicative of an uplink scheduling grant on multiple carriers in the unlicensed spectrum.

As to a still further aspect, a station for transmitting uplink scheduling grant information from a network node to a wireless device in unlicensed spectrum is provided. The station may comprise the device according to the other aspect or may be configured to perform the method aspect. Alternatively or in addition, the station comprises an LBT module for performing a listen before talk (LBT) process on each of at least one carrier in the unlicensed spectrum; and a transmit module for transmitting the uplink scheduling grant information on one of the at least one carrier in response to a positive result of the LBT process on the one carrier, the uplink scheduling grant information being indicative of an uplink scheduling grant on multiple carriers in the unlicensed spectrum.

The station may be the network node. The station may be configured to provide wireless connectivity in a radio access network (RAN).

The device and/or the station may further include any feature disclosed in the context of the method aspect. Particularly, any one of the units and modules, or a dedicated unit or module, may be configured to perform one or more of the steps of any one of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 3GPP Long Term Evolution (LTE) implementation using Licenses Assisted Access (LAA) or a successor thereof, it is readily apparent that the technique described herein may also be implemented in any other wireless communication network, including MulteFire according to the MulteFire Alliance, LTE in unlicensed spectrum (LTE-U) according to 3GPP, a Wireless Local Area Network (WLAN) according to the standard family IEEE 802.11, ZigBee based on the standard family IEEE 802.15.4 and/or a Worldwide Interoperability for Microwave Access (WiMAX) according to the standard family IEEE 802.16.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the functions and steps or implement the units and modules disclosed herein.

Figure 1:
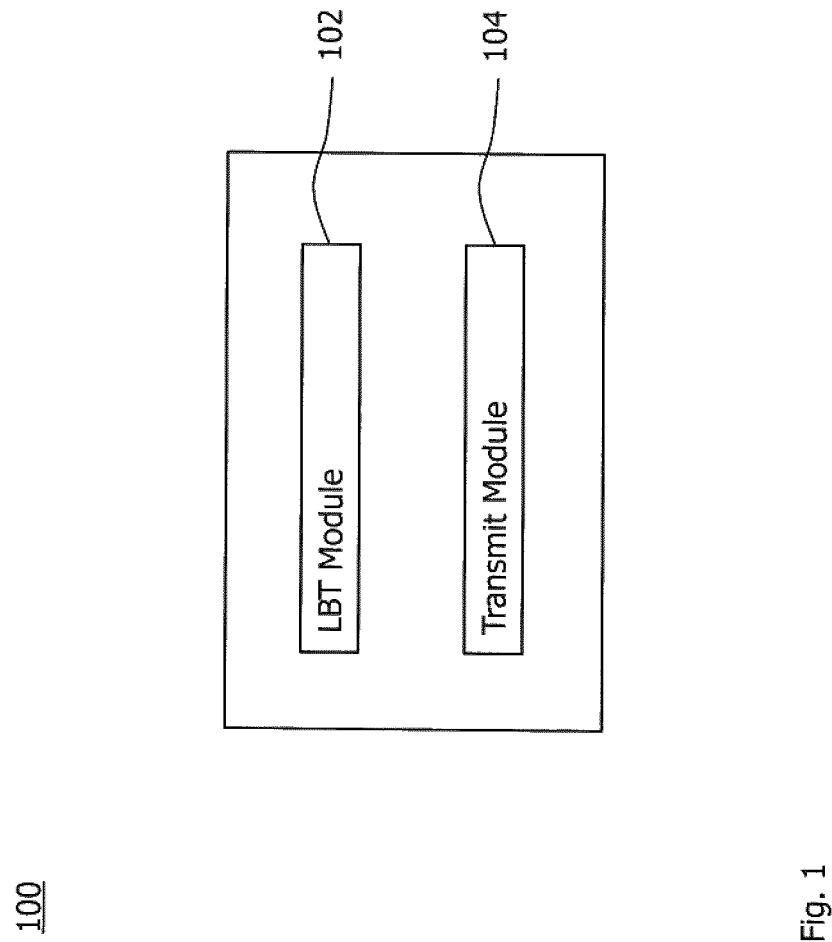
FIG. 1 shows a schematic block diagram of a device for transmitting uplink scheduling grant information from a network node to a wireless device in unlicensed spectrum.

FIG. 1 schematically illustrates a block diagram of a device 100 for transmitting uplink scheduling grant information in unlicensed spectrum. The device 100 comprises a listen-before-talk (LBT) module 102 for performing an LBT process. The LBT module 102 performs LBT processes on at least one carrier in the unlicensed spectrum.

A transmit module 104 transmits the uplink scheduling grant information on a carrier in the unlicensed spectrum to a wireless device in response to a positive result of the LBT process for the carrier. Conventional techniques may grant uplink radio resources on a carrier by transmitting the corresponding uplink scheduling grant information on same carrier, e.g., according to a one-to-one relation between the carrier for transmitting the grant information and the granted carrier. In contrast, the transmit module 104 transmits the uplink scheduling grant information that is indicative of multiple granted carriers in the unlicensed spectrum on a single carrier in the unlicensed spectrum, e.g., according to a one-to-many relation between the one carrier for transmitting the grant information and the multiple granted carriers.

Figure 2:
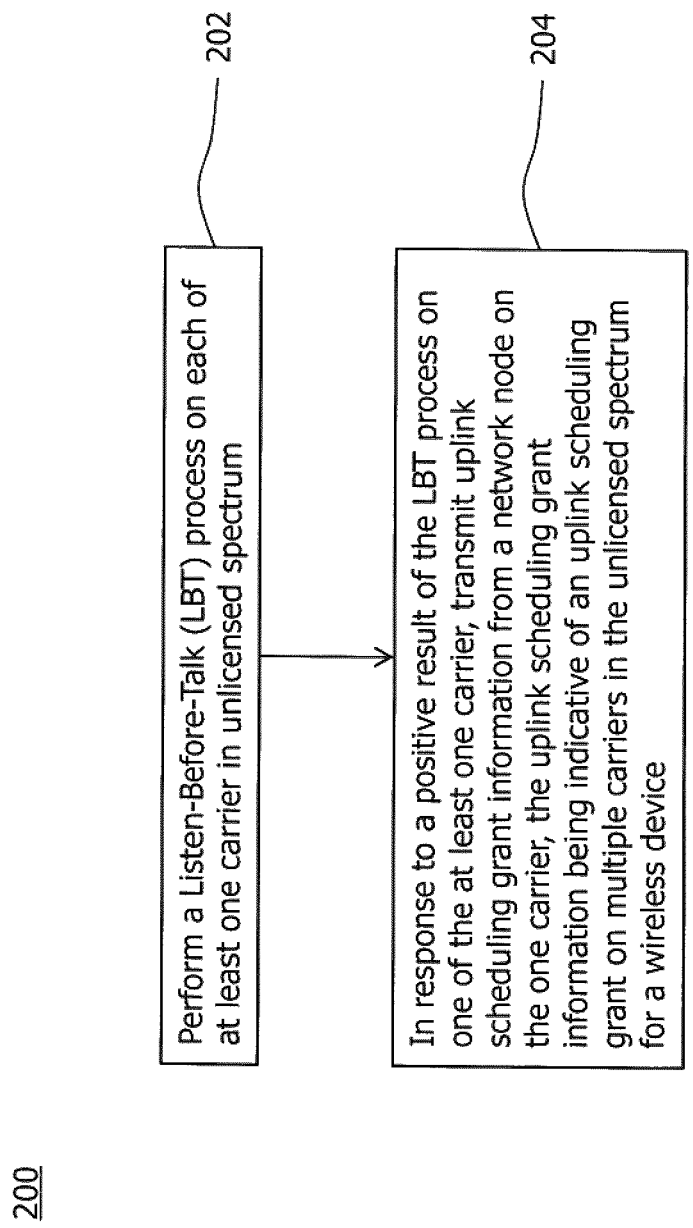
FIG. 2 shows a flowchart for a method of transmitting uplink scheduling grant information from a network node to a wireless device in unlicensed spectrum, which is implementable by the device of FIG. 1.

FIG. 2 shows a method 200 of transmitting uplink scheduling grant information in unlicensed spectrum. In a step 202, the LBT process is performed on each of at least one carrier in the unlicensed spectrum.

In a step 204 of the method 200, in response to at least one successfully completed LBT process, the uplink scheduling grant information is transmitted on the carrier on which the LBT process has been successfully completed. While the uplink scheduling grant information is transmitted on one carrier, the uplink scheduling grant information conveys to a wireless device the grant on multiple carriers in the unlicensed spectrum for uplink data transmission.

The method 200 may be performed by the device 100, e.g., at the network node. For example, the modules 102 and 104 may perform the steps 202 and 204, respectively.

The network node may be a base station. The wireless device may be a user equipment (UE). In a 3GPP LTE implementation of the RAN, the network node may be an evolved Node B (eNB).

The technique may be implemented as a grant transmission for multi-carrier (or multi-channel) LBT scenarios in unlicensed spectrum. The technique may be implemented for LAA (i.e., with a control channel in licensed spectrum) and/or for a standalone implementation (i.e., without usage of licensed spectrum, e.g., in at least a part of the RAN).

The step 204 implements a cross-carrier scheduling in the unlicensed spectrum. The transmission of grant information in the step 204 and the transmission of downlink data are treated differently. With cross-carrier scheduling in the unlicensed spectrum, the network node may configure one carrier to transmit the grant information that is indicative of the grant for all carriers to be aggregated in an uplink transmission. Using cross-carrier scheduling and transmitting the grant information on only one carrier substantially increases the probability that the wireless device can aggregate multiple carriers for the uplink transmission. The uplink multi-carrier aggregation is not limited by the downlink transmission of grant information at the network node, but only by the LBT processes performed at the wireless device before starting the uplink transmission.

Figure 3:
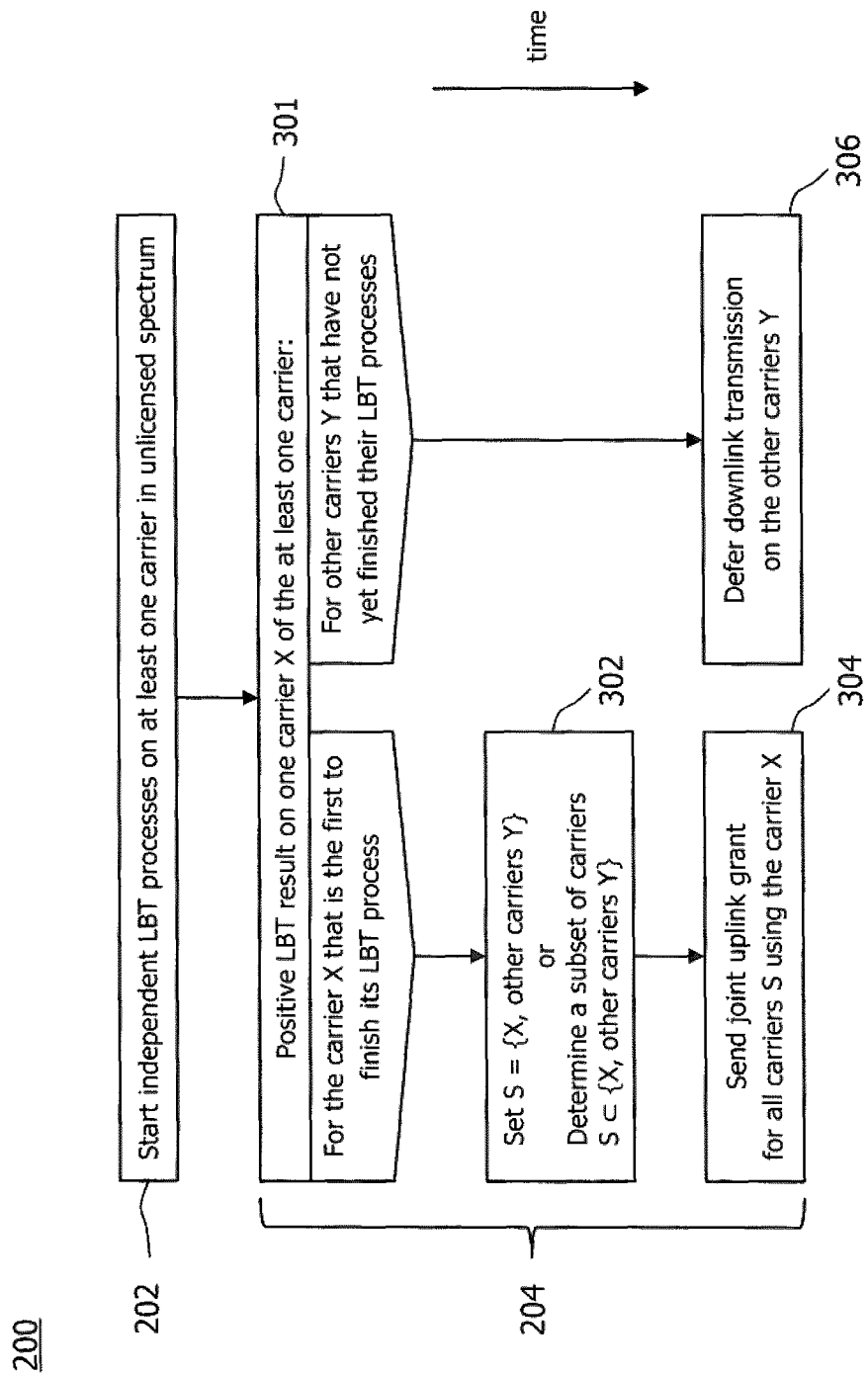
FIG. 3 shows a flowchart for a first implementation of the method of FIG. 2 involving the device of FIG. 1.

FIG. 3 shows a flowchart for a first implementation of the method 200. Reference signs equal to those of FIG. 2 indicate implementations of corresponding steps.

If the device 100 starts an LBT process on more than one carrier, the LBT processes on different carriers are initialized independently and/or executed independently according to the step 202, until at least one of the LBT processes finishes (i.e., yields a positive result) at reference sign 301.

An LBT process on a carrier X finishes, when the backoff time of the LBT process expires as the Clear Channel Assessment (CCA) on the carrier X indicates that the carrier is idle, unoccupied or clear. The CCA may indicate that the carrier is clear, if a time-averaged radio-power measurement or a radio-energy measurement on the carrier over a predefined CCA duration is below a predefined threshold.

If one of the LBT processes finishes (e.g., in the first subframe yielding a positive result since the step 202 started), the network node transmits the grant information on the corresponding one carrier (denoted by X in FIG. 3). If more than one of the LBT processes finishes simultaneously (e.g., within the same subframe), the network node selects one carrier (denoted by A among the carriers the LBT processes of which have finished. The selection may depend on a metric evaluated for each of the carriers the LBT processes of which have finished. Alternatively or in addition, for different wireless devices in radio-connection with the network node, the network node may select different carriers.

In an optional substep 302 of the step 204, the network node determines (e.g., based on the metric) a subset among the other carriers Y the LBT processes on which have not yet finished. The network node 204 grants the subset in unification with the downlink-transmitting carrier X In a variant of the optional substep 302 (shown as the alternative in FIG. 3 at reference sign 302), the network node to determines (e.g., based on the metric) a proper subset S out of the downlink-transmitting carrier X and the other carriers Y the LBT processes of which have not yet finished. Thus, in the variant, the downlink-transmitting carrier X is not necessarily among the set S of the granted multiple carriers.

The grant information indicative of all carriers, or the carriers in the selected subset 5, is transmitted in a substep 304 of the method 204. While the one carrier X is used for transmitting the grant information, any transmission on the other carriers Y is self-deferred (indicated at reference sign 306), as the LBT backoff time is halted.

Figure 4:
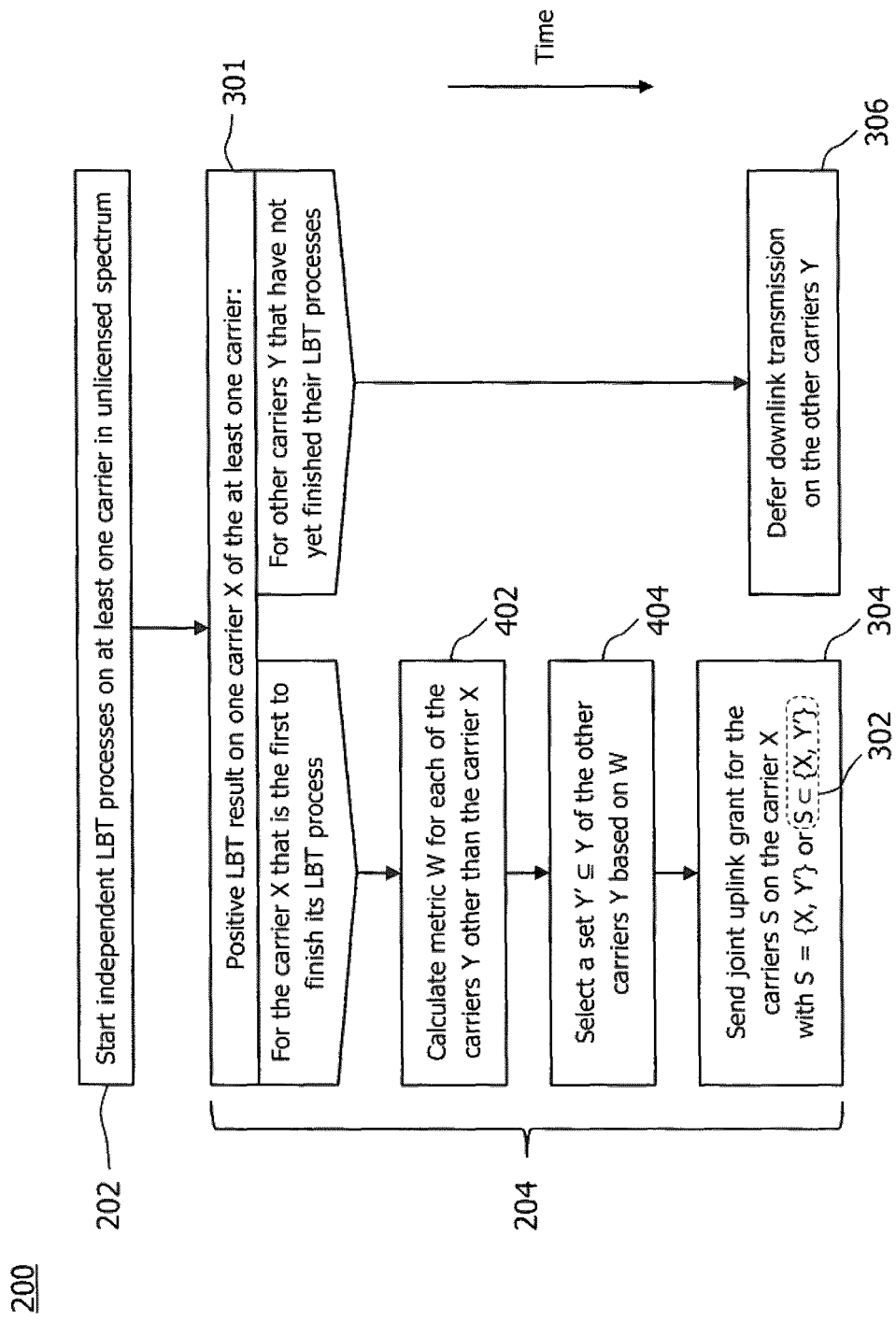
FIG. 4 shows a flowchart for a second implementation of the method of FIG. 2 involving the device of FIG. 1.

FIG. 4 shows a flowchart for a second implementation of the method 200. Reference signs equal to those of FIG. 2 or FIG. 3 indicate implementations of corresponding steps.

In a substep 402 of the step 204, the network node calculates for each of the carriers other than the one used for the grant transmission (i.e., for each carrier labelled by j in the set Y) a metric value $W_j$ by evaluating a metric W.

In a substep 404 of the step 204, a set Y' is selected out of the other carriers Y based on the metric. In one variant, the n best carriers (e.g., the n carriers with the highest metric value) are selected. By way of example, in case the number of n LBT chains supported by the wireless device is less than the number of m possible or available channels Y for transmission, the network node narrows down the number of carriers Y' that are granted for the wireless device by selecting the n best carriers among the list Y of the m possible unlicensed carriers.

In another variant of the substep 404, all carriers associated with a metric value above a predefined threshold value $W_{th}$ are selected.

The metric W may depend on one or more parameters P. The dependency may be linear, e.g., by weighting the parameters according to:

$$W(j)=w_1 \cdot P_1(j)+w_2 \cdot P_2(j)+ \ldots +w_i \cdot P_i(j)$$
$$\text{for each } j=1, \ldots, m. \quad (1)$$

Herein, the parameters $P_1, P_2, \ldots, P_i$ are the influencing factors of the metric, and $w_1, w_2, \ldots, w_i$ are their corresponding weights, e.g., indicating the importance and/or reliability of the parameters.

The weights may be predefined, e.g., based on the scenario itself, the network setup or the RAT. Alternatively or in addition, the weights may be changed during operation of the RAN or the network node, e.g., according to varying Quality of Service (QoS) requirements and/or varying spectral conditions. The values for each of the weights are in the range [0, 1]. The weights are normalized, i.e., their sum equals 1:

$$\Sigma_{r=1 \ldots i} w_r = 1. \quad (2)$$

As non-limiting examples, the parameters P may include at least one of: a ratio of failed LBT processes on this carrier (e.g., counted within a past period of defined duration); a ratio of collisions on this carrier (e.g., counted within a past period of defined duration); energy detected on the carrier (e.g., a time average over a past period of defined duration); a backoff time assigned to the carrier for the LBT process; and a size of a contention window for the LBT process.

Furthermore, any of above parameters may be included in the metric based on a measurement at the network node, based on a report from the wireless device (e.g., reporting as to a measurement at the wireless device) or based on both.

The optional step 302 may be implemented as a further selection step, e.g., independent of the metric. For example, the network node may serve a plurality of wireless devices. The set Y' may be determined in the steps 402 and 404 based on a first metric that is node-specific and/or device-unspecific (e.g., the parameters of the first metric relate to the carriers as observed at the network node). In the step 302, the carriers Y' are distributed among the plurality of wireless devices, e.g., based on a second metric. The second metric may be device-specific. E.g., the second metric may depend on a filling status of an uplink data buffer at the wireless device.

Figure 5:
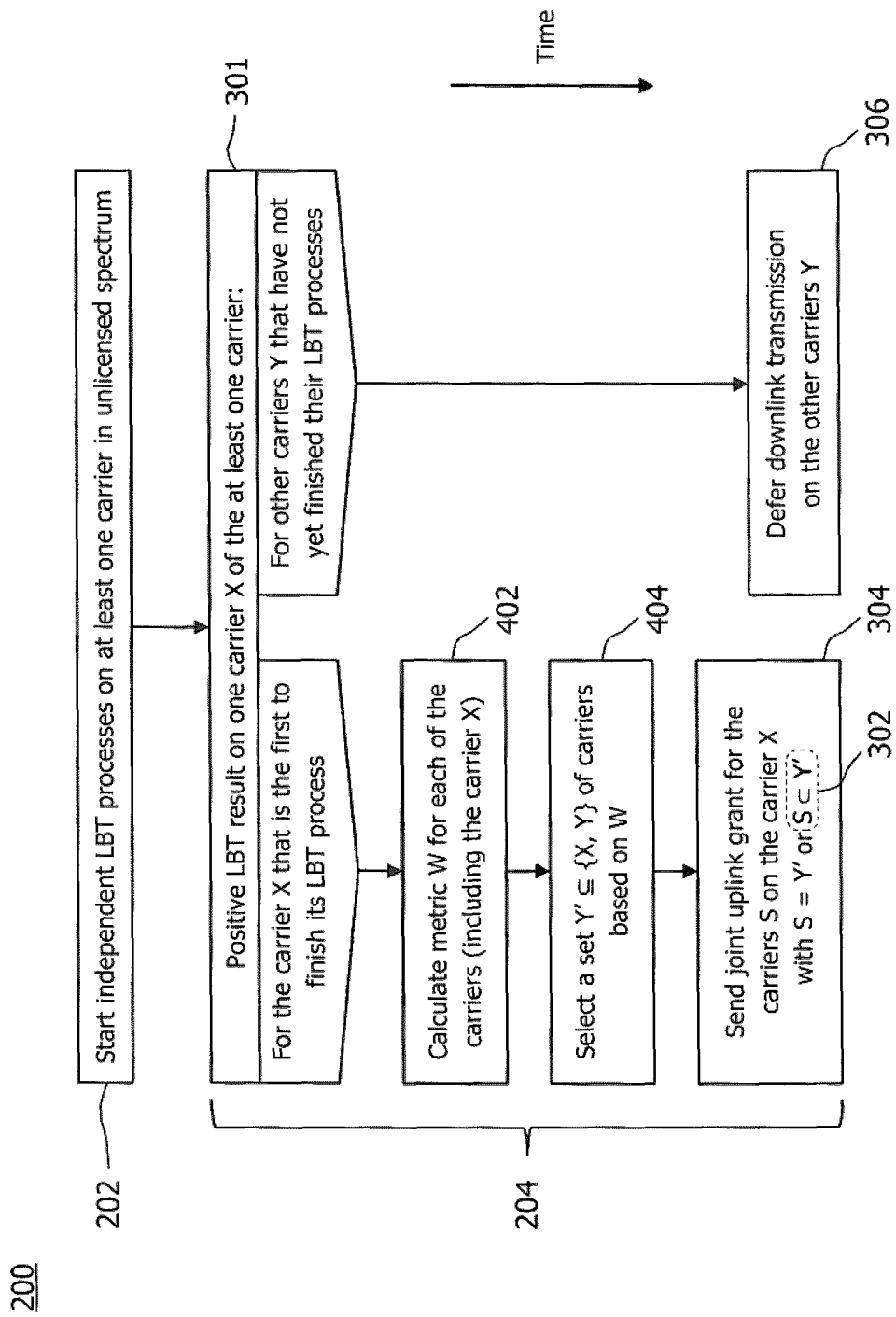
FIG. 5 shows a flowchart for a third implementation of the method of FIG. 2 involving the device of FIG. 1.

FIG. 5 shows a flowchart for a third implementation of the method 200. Reference signs equal to those of any of FIGS. 2 to 4 indicate implementations of corresponding steps.

The third implementation differs from the second implementation in that the metric-based selection in the steps 402 and 404 is allowed exclude the carrier X (used for transmitting the grant information) from the multiple carriers granted according to the grant information.

Figure 6:
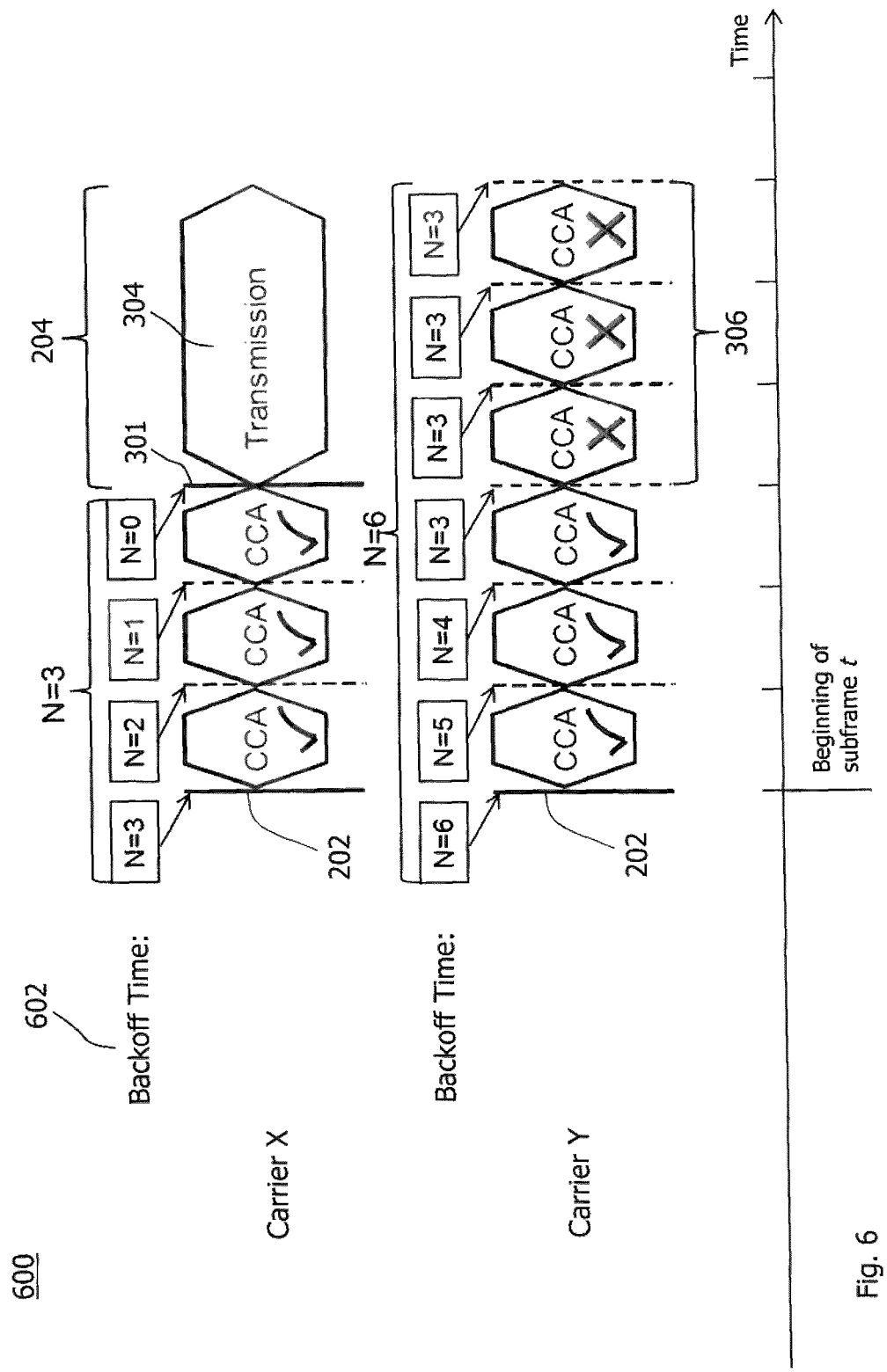
FIG. 6 a first example of a time sequence for a radio communication between a network node and a wireless device.

FIG. 6 shows a first example for a time sequence 600 of radio operations resulting from an implementation of the method 200, e.g., any of the implementations described with reference to FIGS. 1 to 5.

Even though the LBT processes may be started simultaneously on different carriers X and Y in the step 202, the intended transmission time of the independent LBT processes may differ due to unequal channel conditions and/or unequal initial values of a backoff time 602. The latter case is illustrated in FIG. 6.

The unequal transmission times implied by the respective LBT processes cause a head start for transmitting on one or a few carriers X This transmission causes a cross-carrier self-interference at the network node. The self-interference blocks all other carriers Y at reference sign 306 from performing a meaningful CCA (which is also referred to as self-deferral).

Thus, the immediate transmission after the random backoff leads to self-interference at a station (e.g., the network node) and causes an arbitrary and incomplete usage of carriers in conventional channel access techniques for multi-carrier operation in the unlicensed spectrum.

The present technique does not suffer from this incomplete usage, since the transmitting step 204 signals all possible or all selected carriers for the multi-carrier operation to the wireless device.

For clarity, two carriers as assessed by the network node are illustrated in FIG. 6. On each of the carriers X and Y, an independent LBT process is performed with different random backoff time N to access the respective carrier. The backoff time may be represented as an integer backoff number, as the backoff time is discretized in units of a backoff slot.

Both carriers X and Y find the corresponding carriers idle for the first few CCA slots (e.g., the first 3 CCA slots in the example of FIG. 6) when performing the LBT process according to the step 202. Since the random initial value for the backoff time N at reference signal 602 is less for the carrier X, the LBT process on the carrier X succeeds earlier (e.g., at the end of the 3rd CCA slot in FIG. 6) than the LBT process on the carrier Y. The LBT process on carrier Y is still counting down its backoff time as the transmission starts according to the step 304.

As the transmission 304 on the carrier X starts, the network node is forced to postpone decrementing the backoff time 602 on the other carrier Y and to stop the sensing (or CCA) for the LBT process, e.g. for at least one of the following reasons. A radio unit of the network node may be limited to either transmit or receive simultaneously (although on different carriers). Moreover, the transmission on carrier X may leak into a receiving filter of carrier Y and cause interference, so that the other carrier Y does not get a chance (e.g., in the sense of a positive CCA) to transmit as long as the carrier X is transmitting.

In cellular RATs (such as LTE), the uplink access is typically controlled by the network node, i.e. scheduled. In this case, the wireless device reports to the network node when data is available to be transmitted, e.g. by sending a scheduling request (SR) message. In the step 204, based on the SR message, the network node grants the resources and relevant information to the wireless device in order to carry out the transmission of a certain size of data.

Hereby, the wireless device cannot initiate an uplink transmission in a certain subframe, if the wireless device has not yet received the grant information from the network node and processed the grant information by decoding the grant for this subframe. The processing may take about 3 ms. The subframe duration may be 1 ms. After the wireless device receives and processes the uplink grant information, the wireless device performs its LBT processes and, given a successful conclusion thereof, starts the transmission on the corresponding carriers among the granted multiple carriers.

The uplink transmissions apply an uplink LBT protocol for sharing the unlicensed spectrum and observe the time structure defined (e.g., in terms of a radio frame, subframes, slots and symbols) by the network node. The uplink data transmission by the wireless device may span several subframes subsequent to a successful uplink LBT process.

The multi-carrier operation is an extension of the single-carrier operation. For uplink data transmissions on a given component carrier, the wireless device expects to receive a grant on this component carrier or by means of cross-carrier scheduling in the uplink scheduling grant information indicative of this component carrier.

The technique can be implemented to convey in a single grant transmission 304 the grant information indicative of multiple carriers. The single grant transmission 304 may comprise one subframe or multiple subsequent subframes.

Figure 7:
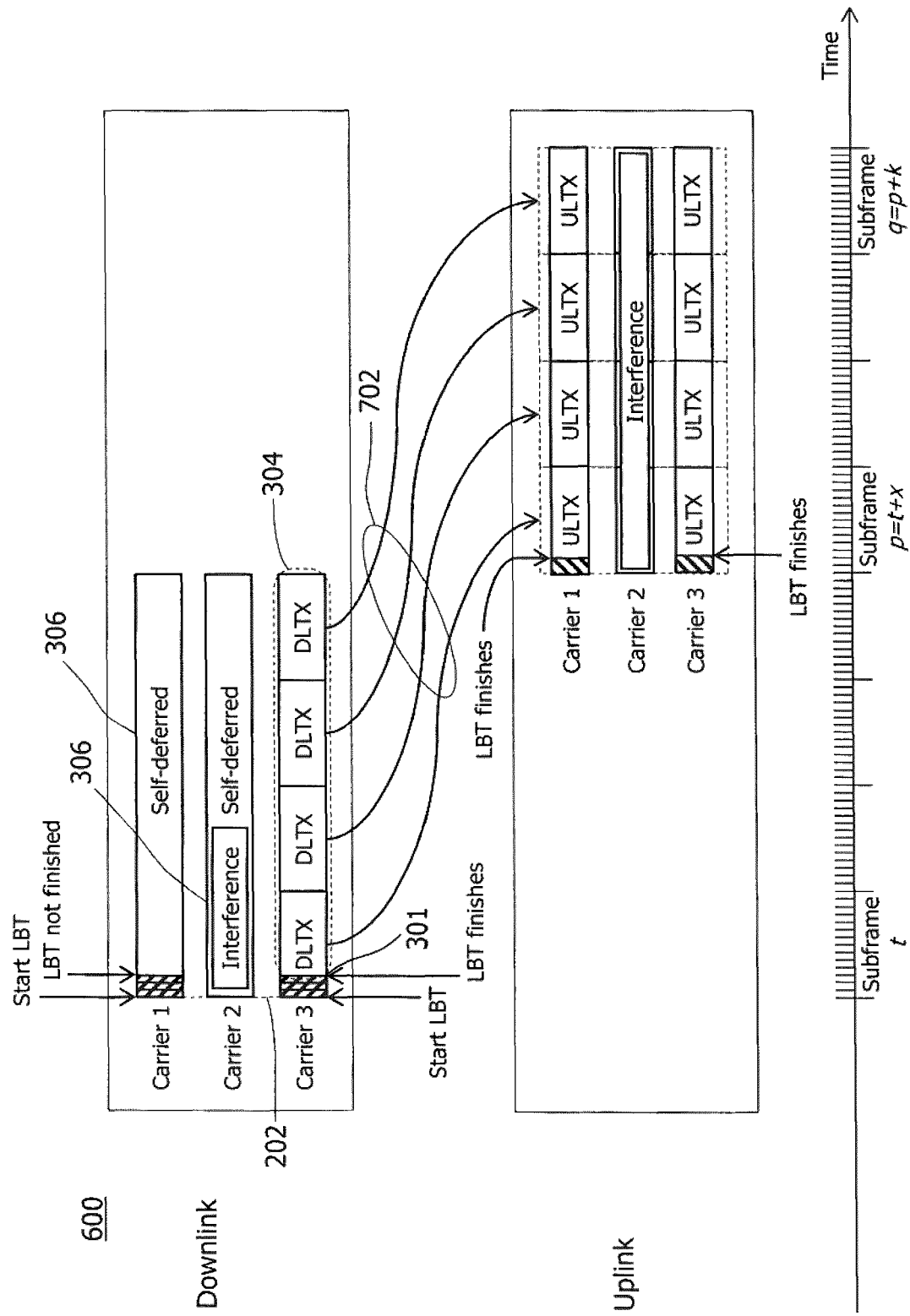
FIG. 7 a second example of a time sequence for a radio communication between a network node and a wireless device.

FIG. 7 schematically illustrates a second example of a time sequence 600 for a radio communication between the network node and the wireless device. The grant information 702 is prepared and transmitted in the step 204 according to a single-subframe scheduling scheme. That is, any one subframe used for (e.g., partially) transmitting the grant information 702 is indicative of one future subframe granted on the multiple carriers for uplink transmission. For granting multiple subframes, the single grant transmission 304 extends in the time domain over subsequent subframes. The number of subframes used for transmission in the step 304 corresponds to the number of the granted subframes.

Each unlicensed carrier operates its own random backoff cycle. In other words, a CCA check is performed individually (e.g., periodically in each CCA slot) on each unlicensed carrier in order to decrement the backoff time 602 associated with the respective carrier. The unlicensed carriers may have independent backoff times 602 or may be jointly assigned a common backoff time 602.

By way of example, the carrier X which completes the backoff mechanism of the LBT process, transmits the grant information for itself and all other possible carriers Y. The remaining backoff time 602 of the other carriers Y is not necessarily discarded at the network node. The backoff time may be resumed when a further grant information 702 needs to be transmitted.

The carriers may be implemented by different secondary cells according to LTE LAA or cells (e.g., secondary cells) of a standalone implementation in unlicensed spectrum.

FIG. 7 shows a non-limiting example with 3 unlicensed carriers, each operating its own random backoff cycle. The allowed transmit opportunity (TXOP) duration in the uplink may be, e.g., 4 ms or 4 subframes. The first carrier to finish its random backoff process in the step 301 is the carrier 3. At this point in time, the carrier 1 has not yet finished its LBT process and is, thus, self-deferred according to the step 306 by the transmission 304. For the carrier 2, the backoff time 602 is not decremented due to external interference in the subframe t and partially in the subframe t+1. After the external interference has ended in the subframe t+1, the backoff time 602 of the carrier 2 is still halted due to the self-interference during the transmission 304.

The carrier 3 can immediately transmit the uplink scheduling grant information 702 for each of the carriers 1, 2 and 3. Each grant corresponds to one subframe that occurs x=4 ms later. That is, the subframe t transmits a piece of the grant information 702 that is indicative of the uplink scheduling grant in subframe p=t+4, the subframe t+1 grants subframe p+1=t+5, etc.

After the wireless device receives and processes (which may take about 3 ms) its uplink grant information 702 subframe-by-subframe, the wireless device can start its LBT processes on all the granted multiple carriers for uplink transmission after receiving the first piece of the grant information 702. If the LBT process for the uplink succeeds, the wireless device starts the uplink transmission. The LBT process may be based on a random backoff and/or a CCA check.

Figure 8:
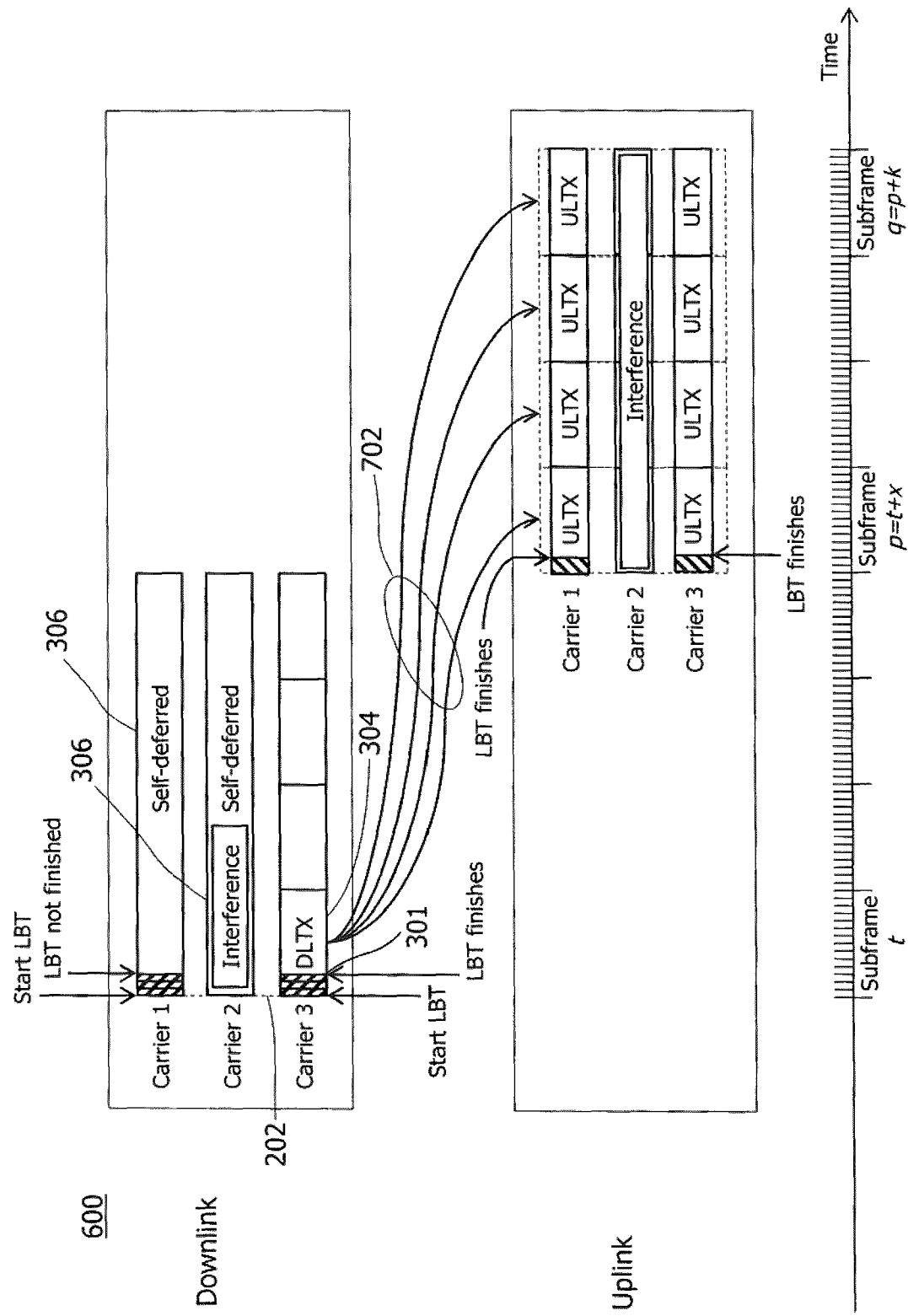
FIG. 8 a third example of a time sequence for a radio communication between a network node and a wireless device.

FIG. 8 shows a third example of a time sequence 600 resulting from implementing the technique. The third example differs from the second example of FIG. 7 in that multiple subframes on the multiple carriers are scheduled using a single transmission of grant information 702.

The third example may implement a multi-subframe scheduling, e.g., in conformity with grant transmission enhancements studied for enhanced LAA (eLAA) as a Work Item in 3GPP Release 14, for example according to document RP-152272 with the title "New Work Item on enhanced LAA for LTE" published for the 3GPP meeting RAN#70 in December 2015.

Instead of transmitting pieces of the grant information 702, each of which corresponds to a single uplink subframe, the network node schedules the wireless device to transmit for multiple uplink subframes using one single grant transmission 304 in one subframe.

The same cross-carrier grant transmission concept (e.g., as in the second example of FIG. 7) may be used in the third example. FIG. 8 shows a non-limiting example with 3 carriers, each of which operates its own random backoff cycle. The allowed TXOP duration in the uplink may be, e.g., 4 ms or 4 subframes. The first carrier to finish its random backoff procedure in the step 301 is the carrier 3.

The carrier 3 can immediately transmit the uplink scheduling grant for the carriers 1, 2 and 3.

Grant information 702 transmitted in the subframe t corresponds to granted subframes t+4 to t+7 in the time domain and each of the 3 carrier in the frequency domain.

After the wireless device receives and processes (which takes about 3 ms) its uplink scheduling grant information 702, the wireless device starts its LBT process on all the granted carriers for uplink transmission. If the LBT process succeeds, the wireless device can start the uplink transmission. The LBT process is based on a random backoff and/or CCA check.

Figure 9:
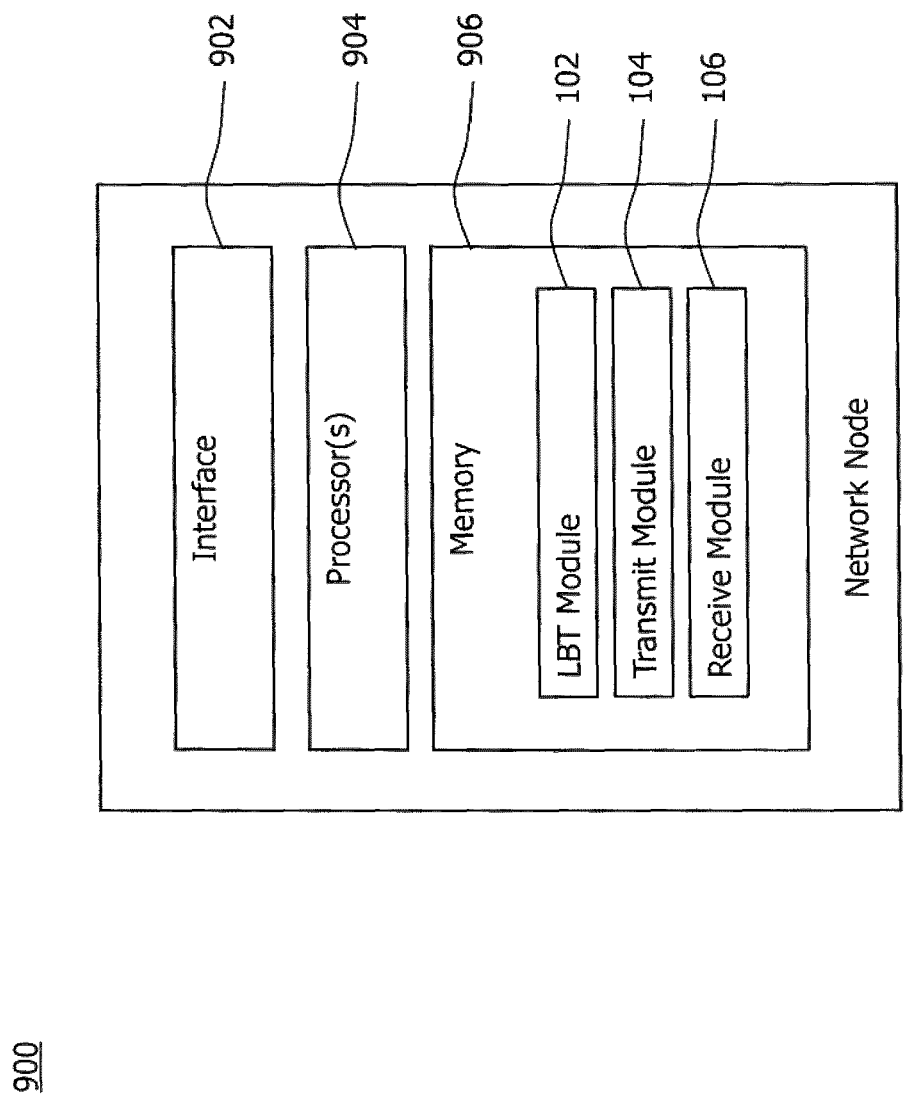
FIG. 9 shows a schematic block diagram of an embodiment of a network node for performing the method of FIG. 2.

FIG. 9 shows a schematic block diagram for an embodiment of the network node 900. The network node 900 comprises a radio interface 902 for providing radio access in a RAN, one or more processor circuits 904 for performing the method 200 and memory 906 coupled to the processor circuits 904. The memory 906 is encoded with instructions that implement each of the LBT module 102 and the transmit 104. Optionally, the memory 906 further includes a receive module 106 for receiving uplink data on multiple carriers in the unlicensed spectrum.

The one or more processor circuits 904 may be a combination of one or more of a microprocessor, controller, microcontroller, central processing unit, digital signal processor, application specific integrated circuit, field programmable gate array or any other suitable computing device, resource or combination of hardware, software and/or encoded logic operable to provide, either alone or in conjunction with other network node components, such as the memory 906, functionality of the network node 900. For example, the one or more processor circuits 904 may execute instructions stored in the memory 906. Such functionality may include providing various wireless features discussed herein to a wireless device, including any of the features or benefits disclosed herein.

The memory 906 may be any form of volatile or non-volatile memory including, without limitation, persistent storage, solid state memory, remotely mounted memory, magnetic media, optical media, random access memory (RAM), read-only memory (ROM), removable media or any other suitable local or remote memory component. The memory 906 may store any suitable data, instructions or information, including software and encoded logic, utilized by the network node 900.

Figure 10:
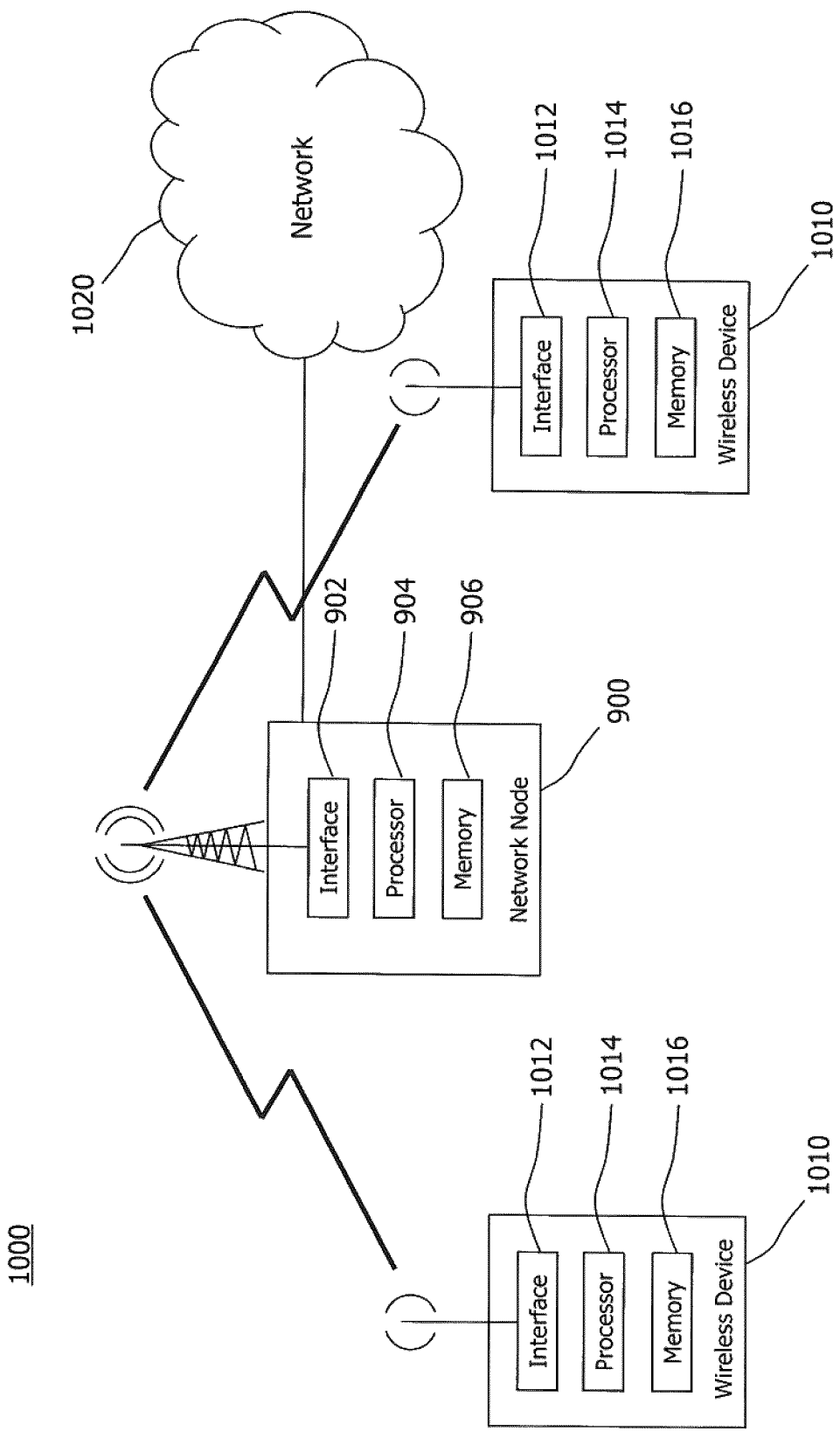
FIG. 10 shows an exemplary network environment including a network node and at least one wireless device.

FIG. 10 schematically illustrates a network environment 1000 for embodiments of the wireless device 1010 and the network node 900. The network node 900 may be in wireless communication for interacting according to the methods 200 with one or more wireless devices 1010.

As has become apparent from above description of exemplary embodiments, at least some embodiments facilitate a multi-carrier operation on unlicensed carriers. Same or further embodiments achieve an efficient contention between LAA stations, between standalone LTE stations and LAA stations, between standalone LTE stations, and between LAA and standalone LTE stations and other radio access technologies in unlicensed spectrum.

The technique may be implemented for multi-carrier operation in standalone LTE-U networks.

The technique may be implemented to enhance uplink LAA or standalone LTE multichannel operation. The cross-carrier grant transmission in unlicensed spectrum may improve the performance of the uplink in multi-carrier (or multi-channel) scenarios and/or increase the likelihood of an uplink joint transmission.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of transmitting uplink scheduling grant information from a network node to a wireless device in unlicensed spectrum, the method comprising:
    performing a listen before talk (LBT) process on each of at least one carrier in the unlicensed spectrum;
    transmitting the uplink scheduling grant information on one of the at least one carrier in response to a positive result of the LBT process on the one carrier, the uplink scheduling grant information being indicative of an uplink scheduling grant on multiple carriers in the unlicensed spectrum;
    determining a metric for a plurality of carriers available in the unlicensed spectrum; and
    selecting the multiple carriers based on the metric.

2. The method of claim 1, wherein the multiple carriers of the uplink scheduling grant include one or more carriers other than the one carrier on which the uplink scheduling grant information is transmitted.

3. The method of claim 1, wherein the multiple carriers of the uplink scheduling grant include the one carrier on which the uplink scheduling grant information is transmitted.

4. The method of claim 1, wherein each LBT process includes: a Clear Channel Assessment (CCA) and/or a random backoff mechanism.

5. The method of claim 1, wherein the LBT process is performed on each of at least two carriers in the unlicensed spectrum.

6. The method of claim 1, wherein the uplink scheduling grant information is transmitted on a first carrier on which the LBT process is the first to return the positive result.

7. The method of claim 1, wherein the uplink scheduling grant relates to multiple subsequent subframes.

8. The method of claim 1, wherein the multiple carriers are a subset of carriers available in the unlicensed spectrum.

9. The method of claim 8, wherein a number of the multiple carriers corresponds to a number of LBT chains supported by the wireless device.

10. The method of claim 8: wherein the network node transmits a further uplink scheduling grant information to a further wireless device; and
    wherein the carriers indicated in the uplink scheduling grant information transmitted to different wireless devices are disjoint.

11. The method of claim 1, wherein the metric depends on a ratio of LBT processes with positive result and LBT processes with negative result on the respective carrier.

12. The method of claim 1, wherein the metric depends on a radio quality of the respective carrier.

13. The method of claim 1, wherein the metric depends on a backoff timer or a contention window size assigned by the network node to the wireless device for the respective carrier.

14. The method of claim 1, further comprising:
    receiving a scheduling request or a buffer status report from the wireless device; and wherein at least the transmitting the uplink scheduling grant information is performed in response to the reception of the scheduling request or the buffer status report.

15. The method of claim 1, further comprising receiving uplink data from the wireless device by means of multi-carrier aggregation of two or more of the multiple carriers.

16. A non-transitory computer readable recording medium storing a computer program product for controlling transmission of uplink scheduling grant information from a network node to a wireless device in unlicensed spectrum, the computer program product comprising software instructions which, when run on processing circuitry of one or more computing devices, causes the one or more computing devices to:
    perform a listen before talk (LBT) process on each of at least one carrier in the unlicensed spectrum;
    transmit the uplink scheduling grant information on one of the at least one carrier in response to a positive result of the LBT process on the one carrier, the uplink scheduling grant information being indicative of an uplink scheduling grant on multiple carriers in the unlicensed spectrum;
    determine a metric for a plurality of carriers available in the unlicensed spectrum; and
    select the multiple carriers based on the metric.

17. A device for transmitting uplink scheduling grant information from a network node to a wireless device in unlicensed spectrum, the device comprising:
    processing circuitry;
    memory containing instructions executable by the processing circuitry whereby the device is operative to:
        perform a listen before talk (LBT) process on each of at least one carrier in the unlicensed spectrum;
        transmit the uplink scheduling grant information on one of the at least one carrier in response to a positive result of the LBT process on the one carrier, the uplink scheduling grant information being indicative of an uplink scheduling grant on multiple carriers in the unlicensed spectrum;
        determine a metric for a plurality of carriers available in the unlicensed spectrum; and
        select the multiple carriers based on the metric.

* * * * *